United States Patent
Davis et al.

(12) 
(10) Patent No.: US 6,225,994 B1
(45) Date of Patent: May 1, 2001

(54) OBJECT SELECTION ACROSS MULTIPLE PROCESSES

(75) Inventors: Stephen Davis; Jacques Boucher, both of Kanata (CA)

(73) Assignee: Crosskeys Systems Corporation, Kanata (CA)

(*) Notice: Subject to any disclaimer, the term of this patent is extended or adjusted under 35 U.S.C. 154(b) by 0 days.

(21) Appl. No.: 09/196,685

(22) Filed: Nov. 20, 1998

(51) Int. Cl.$^7$ .................................................. G06F 15/00
(52) U.S. Cl. ............................................. 345/329; 345/335
(58) Field of Search .................................. 345/329, 356, 345/357, 340, 348, 342, 333, 335; 707/10

(56) References Cited

U.S. PATENT DOCUMENTS

| | | | |
|---|---|---|---|
| 5,239,537 | * 8/1993 | Sakauchi | 370/16 |
| 5,684,988 | 11/1997 | Chen-Yea et al. | 395/615 |
| 5,764,624 | * 6/1998 | Endo et al. | 370/218 |
| 5,805,072 | * 9/1998 | Kakemizu | 340/825.03 |
| 5,826,035 | * 10/1998 | Hamada et al. | 395/200.77 |
| 5,844,902 | * 12/1998 | Perlman | 370/401 |
| 5,943,314 | * 8/1999 | Croslin | 370/216 |
| 5,999,525 | * 12/1999 | Krishnaswamy et al. | 370/352 |

* cited by examiner

*Primary Examiner*—Steven Sax
(74) *Attorney, Agent, or Firm*—Marks & Clerk

(57) ABSTRACT

In a method managing data in an object-oriented environment, a common selected object is referenced across multiple processes with the aid of a suitable protocol.

5 Claims, 15 Drawing Sheets

OBJECT SELECTION ACROSS MULTIPLE PROCESSES

This invention relates to the field of object-oriented programming, and in particular to a method of managing network elements.

In traditional procedural programming, functions dictate program organization. In a procedural language, the functions are coded only once. The function must handle a variety of different types of data. Decision making is handled inside the function, and its effectiveness is largely a matter of the programmer's ability to foresee how many different kinds of data the function will have to sort out. As programs involved, a function would be used for a greater variety of purposes, some of which the program may have foreseen, some not. In a procedural language, one function does many things.

In an object based language, the processor decides which method to use based on the type of object that calls the method. The underlying program code is written specifically for objects.

Most programs are now written in object-oriented languages, and this is true of network management software used for managing large wide area networks.

The Telecommunications Management Network (TMN) model, developed by the International Telecommunications Union (ITU), defines three areas: Element Management, Network Management, and Service Management.

The Element Manager Layer controls the information exchange between network elements or groups of network elements. Functions within this layer communicate with the Network Management Layer by relaying element status and performance to a network management system (NMS).

The Network Management Layer in the TMN Model covers the end-to-end management of an entire network. It contains an overview of the network and knows how elements relate to each other. Focusing on network usage, traffic patterns, bandwidth availability and performance monitoring, the Network Management Layer interacts with the Service Management Layer by exchanging network status information for customer and service data.

Responsibilities of the Network Management Layer include:

controlling and coordinating the network view of all network elements within its domain provisioning and modifying network capabilities for customer-service support maintaining statistical, log and other data about the network and interacting with the Service Management Layer on performance, usage and availability The Service Management Layer is the service provider's first point of contact with customers for all service transactions, including service requests and fault reporting, interaction with other service providers, and maintaining statistical data and interaction between services.

One of the problems with existing software is that it is not possible to select a common object on one application in this model, for example, a 46020 Network Manager (Newbridge Networks Corporation) and pass its attributes into a foreign application, such as a Newbridge 45190 Element Manager. This creates discrepancies between shared information on different applications and degrades data quality through data throughput errors.

According to the present invention there is provided a method managing network elements in an object-oriented environment comprising the step of referencing a common selected object in an application and passing its attributes to an element manager by sending messages with the aid of a suitable protocol.

In this way, discrepancies between shared information on different applications can be eliminated, greatly enhancing data quality through reduced data input errors.

The element manager is typically a graphical element manager (GEM) with a graphical user interface (GUI), in which case the common object can be selected with a pointing device, such as a mouse.

For example, a port (an object) on 46020 Newbridge Networks Corporation Network Manager may be selected and the characteristics (attributes) of the port used by the 45190 element manager. The 46020 can have multiple element managers connected to it and this invention allows the 45190 to determine if the selected object is relevant to it.

The invention also provides a network element manager comprising an object model of a network managed with the aid of a network manager, and an interface for exchanging messages with said network manager using a suitable protocol to permit a common object to be referenced and its attributes to be passed to the network manager.

The invention will now be described in more detail, by way of example only, with reference to the accompanying drawings, in which.

Figure 14:
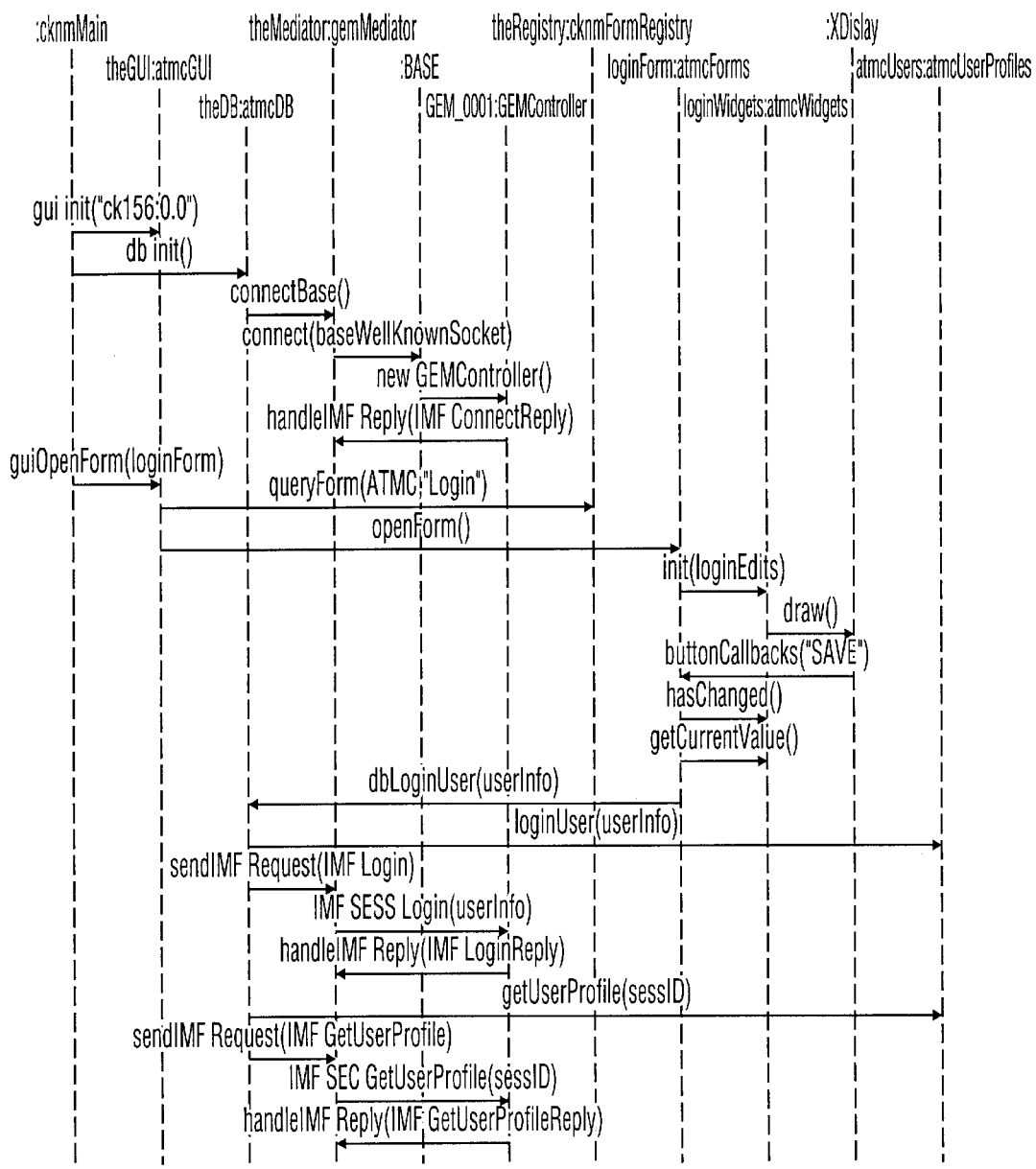
Figure 15:
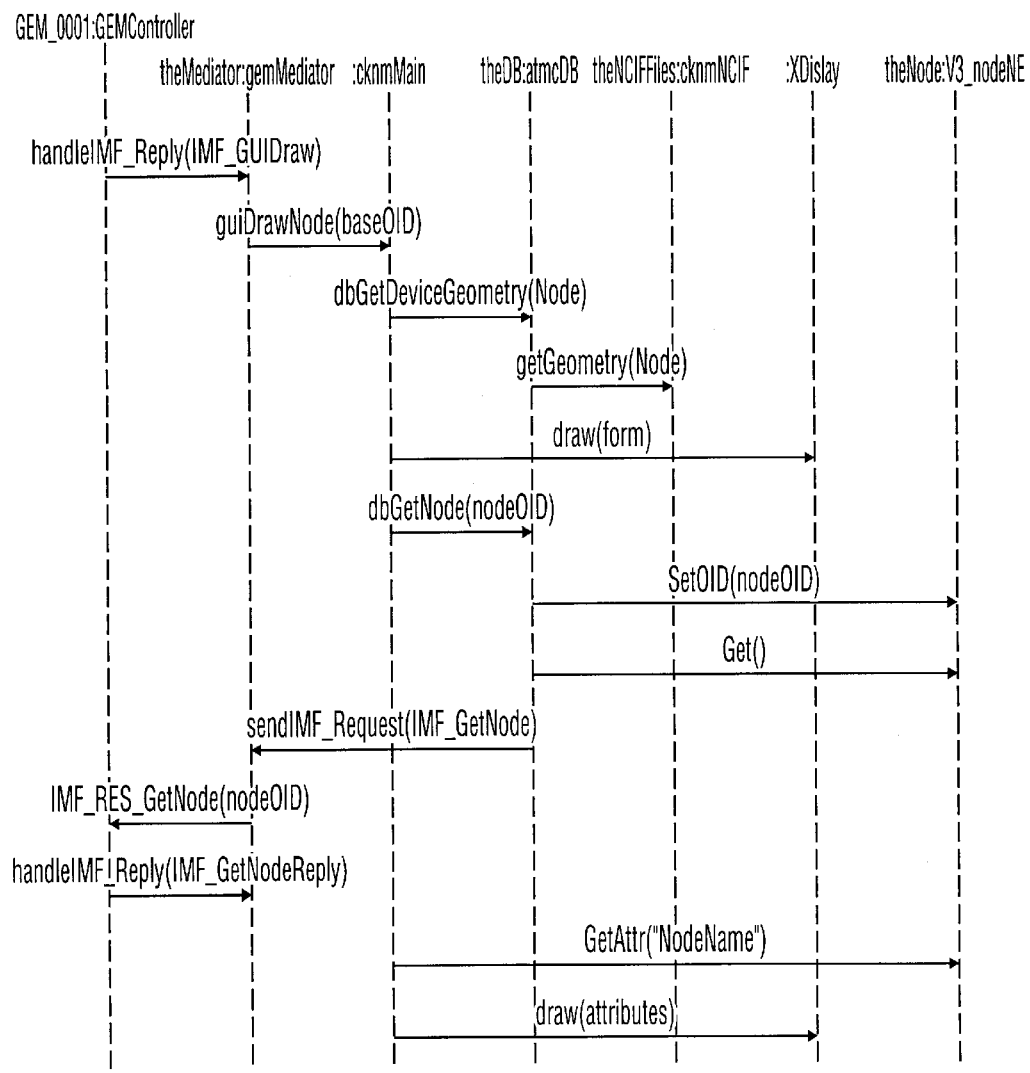

FIG. 14 Local Activation of the ATMC;

FIG. 15 shows a Draw Node Request; and

Figure 16:
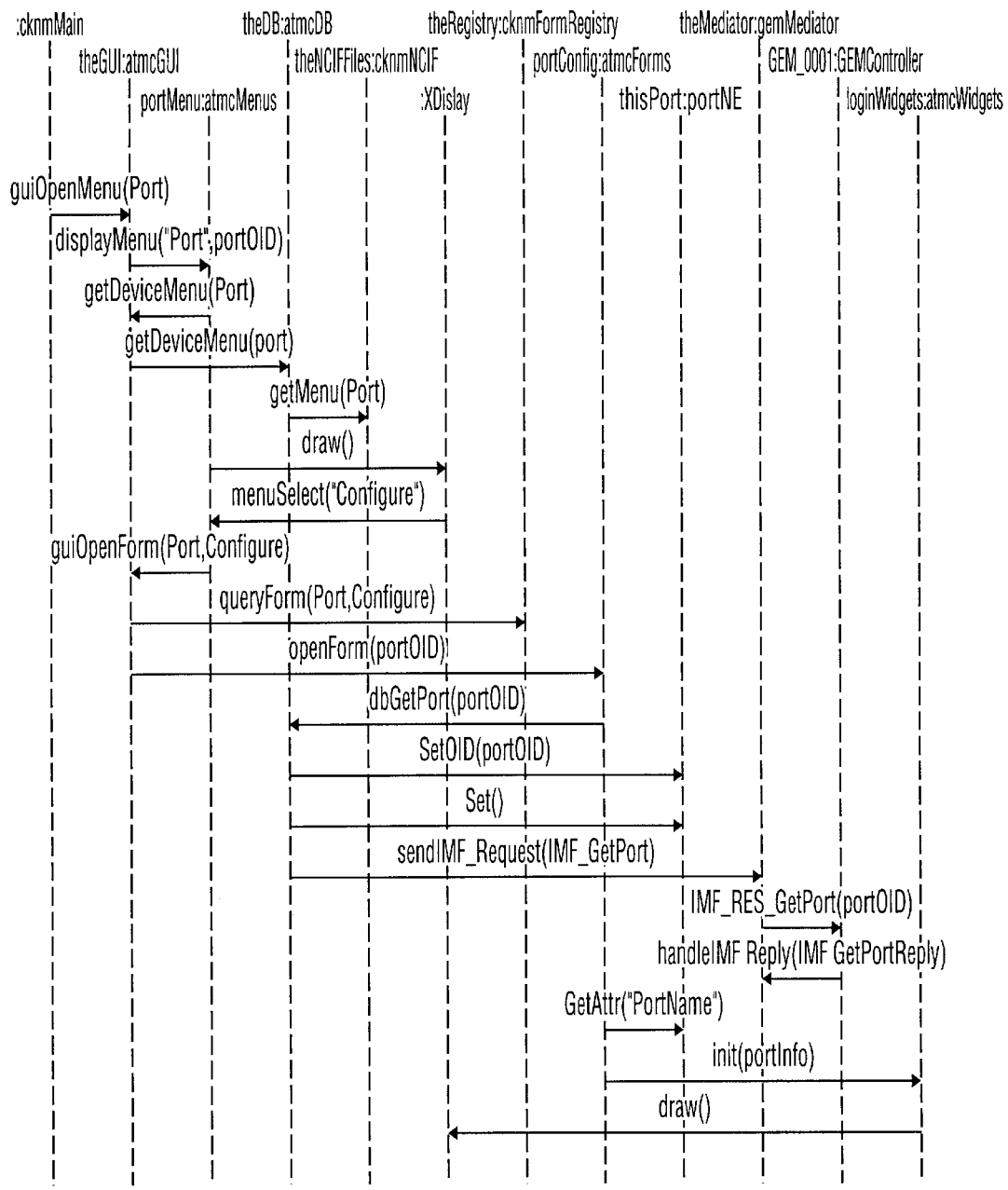
Figure 17:
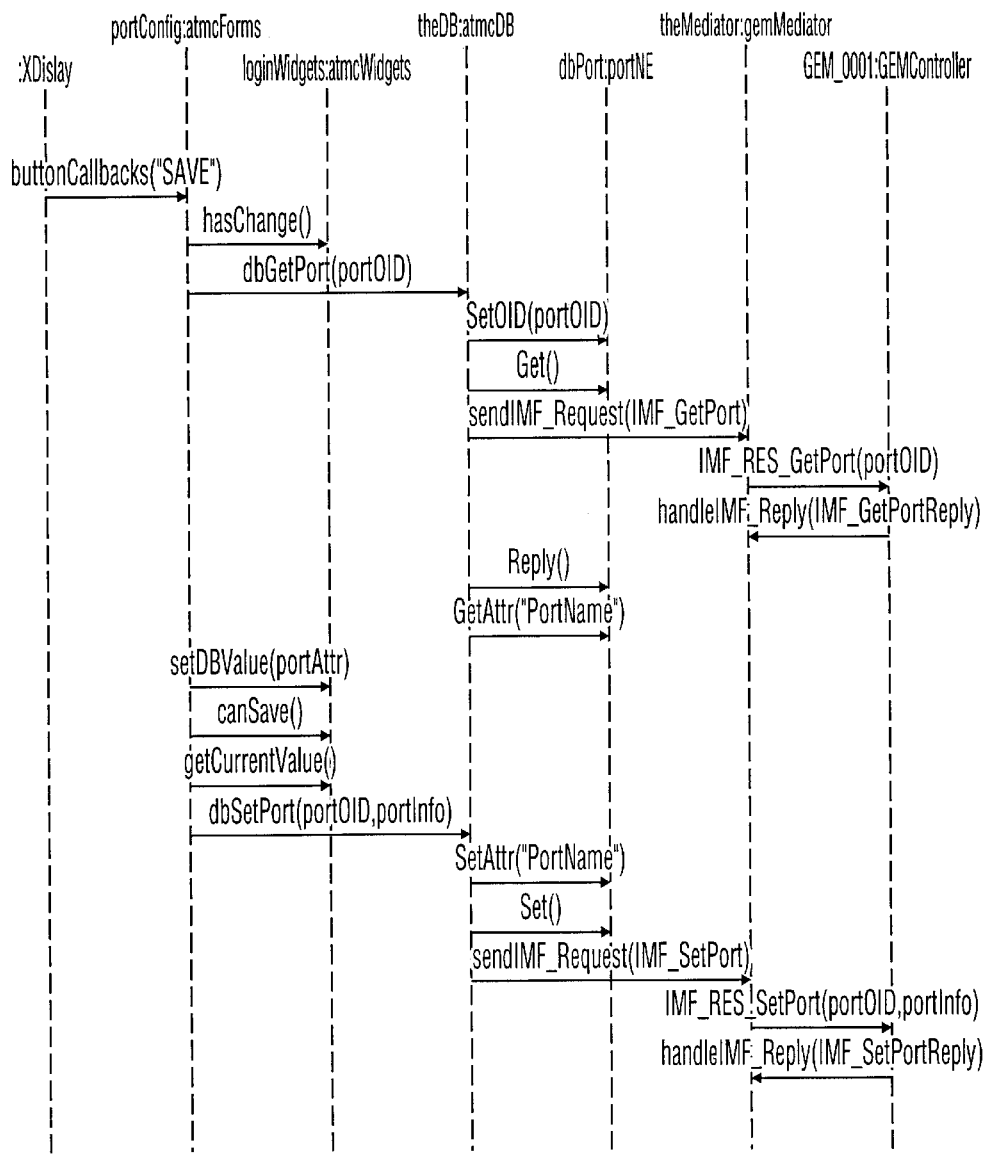

FIG. 16 shows an Open Port Configuration;

FIG. 17 illustrates a set port configuration; and

Figure 18:
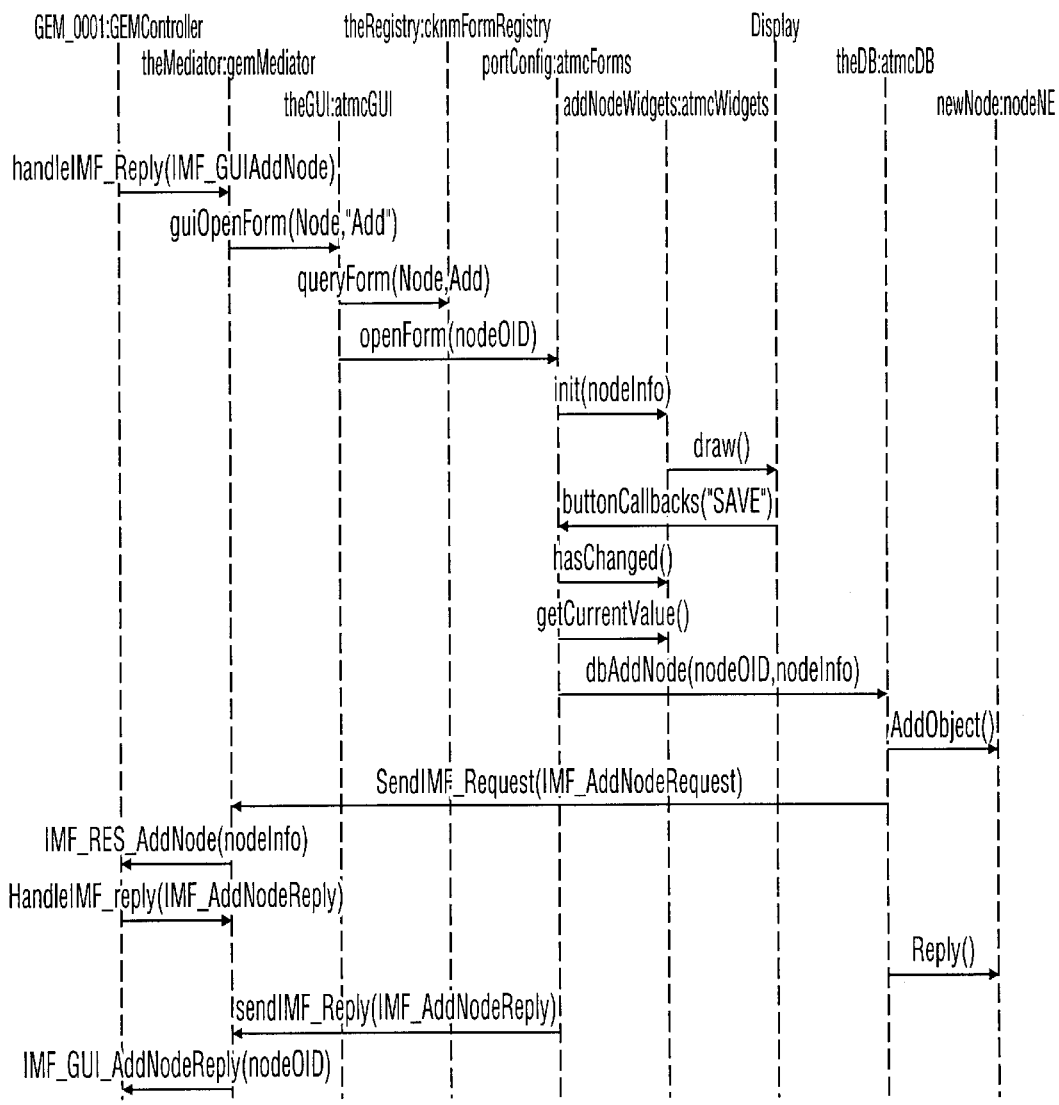

FIG. 18 illustrates an add node request.

Figure 1:
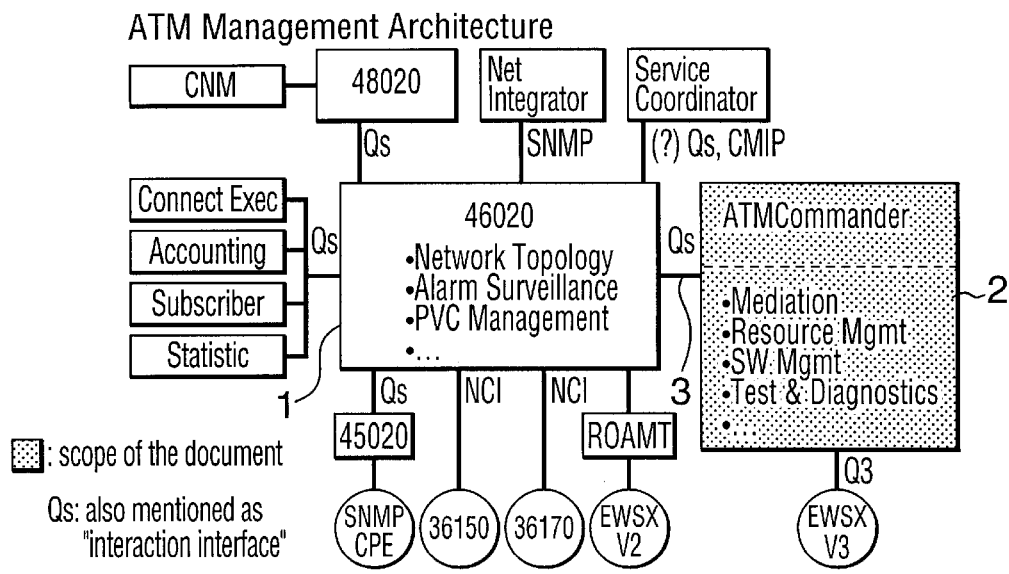
FIG. 1 shows an ATM Management Architecture including an ATMCommander.

The invention is implemented in a graphical element manager (GEM), which provides the GUI component (Graphical User Interface) of the ATMCommander, as shown in FIG. 1, provides a flexible graphical interface, integrated with Newbridge 46020 functionality through the Qs protocol. This interface will provide device (ATMC Switch) specific configuration and displays, allowing the user to interact with the managed devices.

In FIG. 1, a Newbridge Networks Corporation 46020 network manager 1 communicates with a monitoring system 2 in accordance with the invention via a communications protocol Qs over path 3. The complete ATM management architecture is shown in the figure. The Qs protocol is a published interface to the 46020 network manager.

Figure 2:
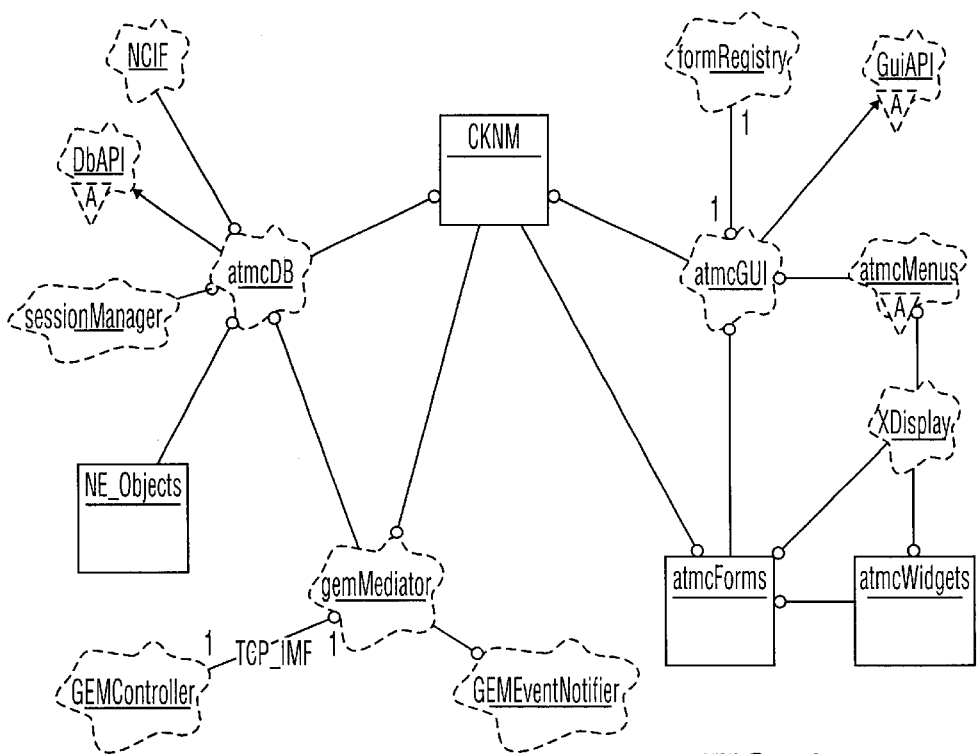
FIG. 2 shows a Graphical Element Manager (GEM) Object Model.

FIG. 2 illustrates the GEM object model and the basic interaction between the objects.

Figure 3:
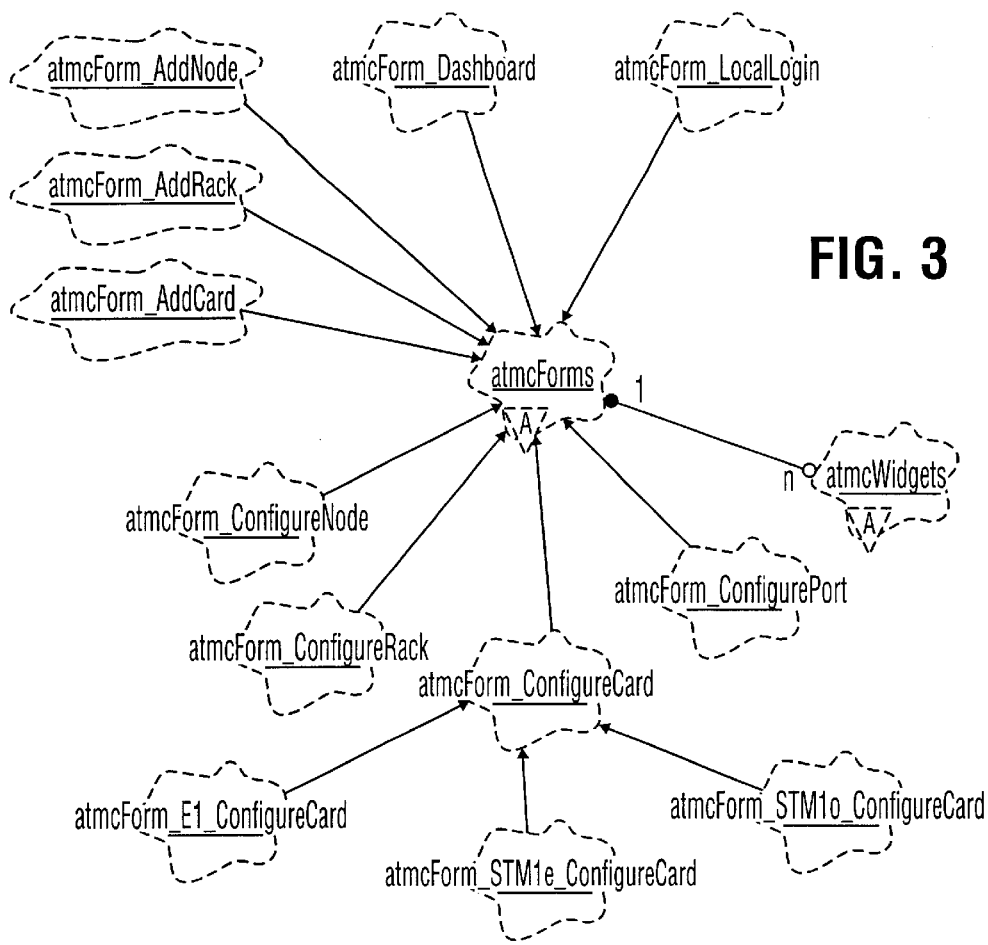
FIG. 3 shows the GEM Form Inheritance.

FIG. 3 illustrates the partial form inheritance included in this design. Forms will be added to the inheritance tree as new configuration requirements are established. Forms will be re-used where available, however, where device configuration varies widely from one device to another of a similar type (i.e. E1 vs. STM-1e or STM-1o card) separate forms will be used. Each form will be responsible for complete data collection and display for the managed device.

Figure 4:
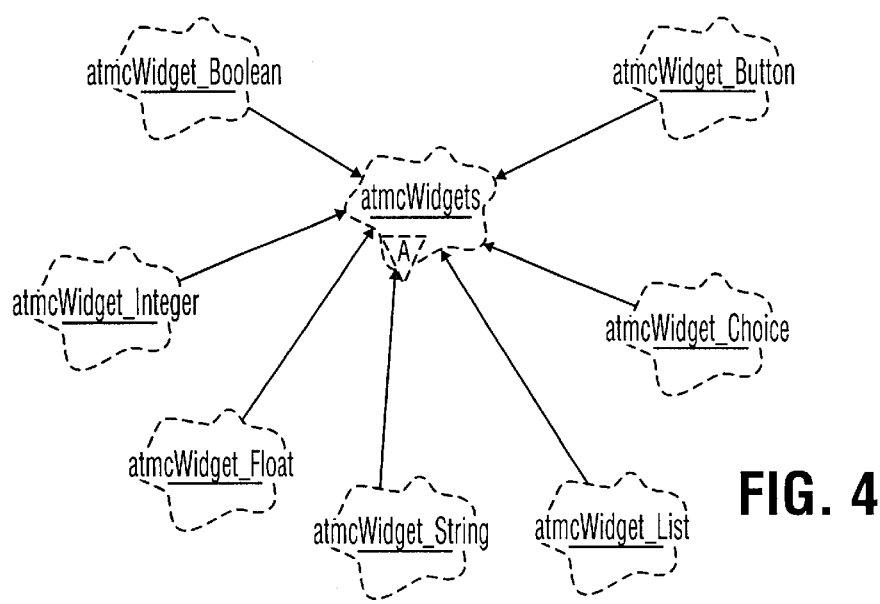
FIG. 4 shows the Widget Inheritance.

FIG. 4 shows a preliminary class inheritance of the ATMC widgets. These objects will be used as intelligent data holders by the configuration forms. These widgets will provide various methods to allow the form to off-load operator interaction, range checking, difference comparison and change notification for the managed data. The form class will concentrate on data retrieval and storage.

Figure 5:
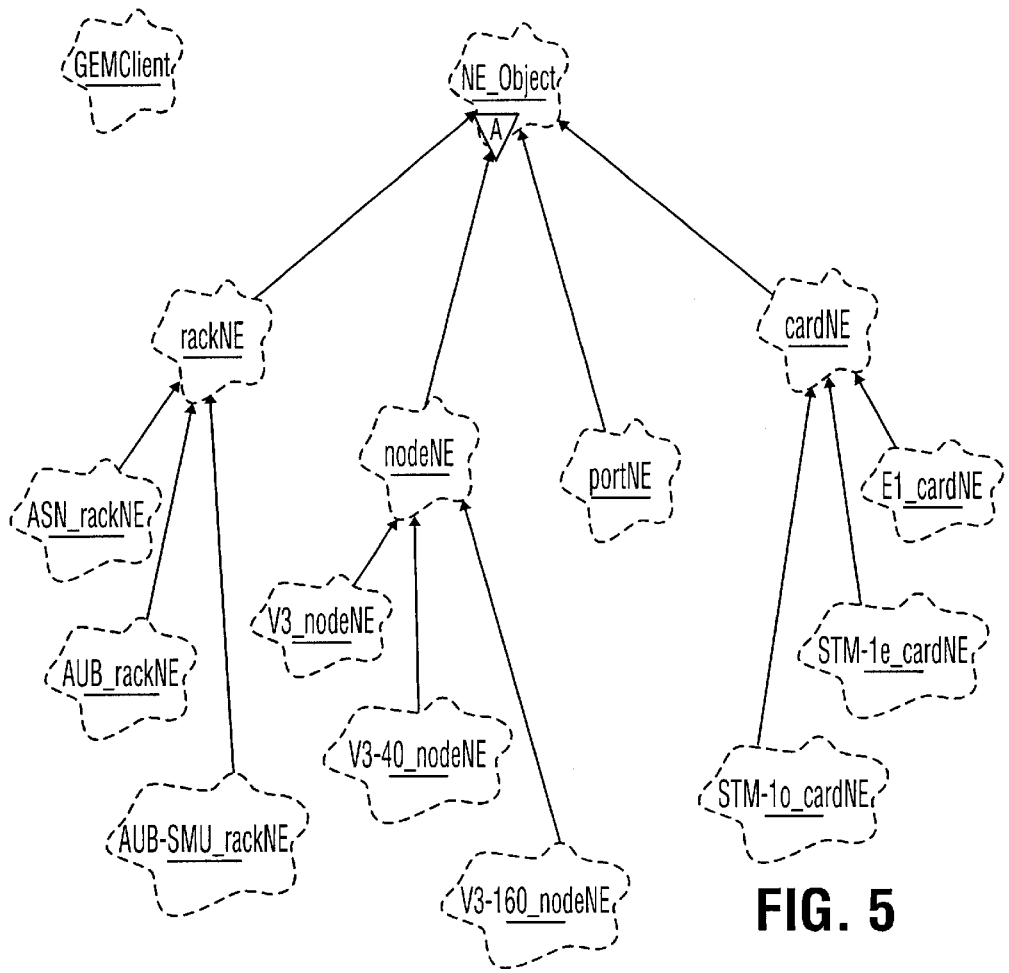
FIG. 5 shows the basic software structure of the system.

FIG. 5 shows the inheritance relationship of the client side IMF (Internal Message Format) objects. These objects will encapsulate the IMF message interaction for each client of the IMF transaction services. The GEM Client will be used by processes requiring access to the graphical display. The GEM process will make use of the resource management client side objects to hide the format and interface to the IMF message objects. These client side objects can be re-used by and process accessing the resource management IMF functions.

The GEM requires three external interfaces, X11/Motif, IMF and Multi-Language Support. These interfaces are described below.

The X11/Motif interface is accessed directly using Xt and Xm calls. Each object interacting with the X-Displays (either local or remote) will perform all of the setup functions required to properly draw on the X-Display. Each GEM process will be responsible for interacting with only a single X-Display (either local or remote) all multiple display functionality will be accomplished by activating multiple GEM processes, each slaved to a single X-Display.

The TCP/IMF interface will provide the GEM process will access to the rest of the ATM-C system through the BASE process. At activation the GEM process will establish a connection to the BASE. Once this connection is negotiated this connection will remain active throughout the duration of the GEM process life-time. A single object, the GEMMediator, will be responsible for sending IMF_Messages to the BASE and receiving IMF_Messages from the BASE.

This object will expose a public interface to allow other functions to send data to the BASE. Two up-calls into the CKNM core software will be used for incoming, unsolicited messages, one for events and one for requests. Outgoing messages can be sent with either a blocking or non-blocking request. The blocking request will provide a time-out mechanism. Incoming replyies that do not have a matching request pending, either through a time-out or a non-blocking call will be dropped after reception.

Multi-language support is achieved through the use of resource strings. All textual information displayed to the operator will be referenced in the code using a string number and a language offset. Each time the display is created the appropriate strings will be loaded from the resource file and shown on the display. This technique will be extended to the enumerated information received from the V3 node (for example Port Status).

The software in the Graphical Element Manager (GEM) is composed of two distinct sub-systems: drawing and configuration. Each will rely on a database to provide data for display to the operator, the interface to the database will be different for each sub-system.

The drawing functionality is implemented in C. Database accesses specific t the ATMC system will be hooked at the lower API interface, implemented in C++ as objects and re-directed into the ATMC system.

The configuration sub-system will invoke this C++ object oriented interface directly. All of the lower level ATMC communication components are implemented in C++ as objects. Each existing function group (i.e. NCIF files, Menus etc.) that these objects must invoke will be wrapped in an object interface. Ultimately the drawing sub-system will be implemented in C++ as objects.

The existing software provides a generic interface into which additional database and graphical display components can be inserted. The GEM will use this software as a base and built on the structure. CKNM is currently a C-language application that is compiled using a C++ compiler, as such we can insert C++ objects into this application without impacting the structure significantly.

Figure 6:
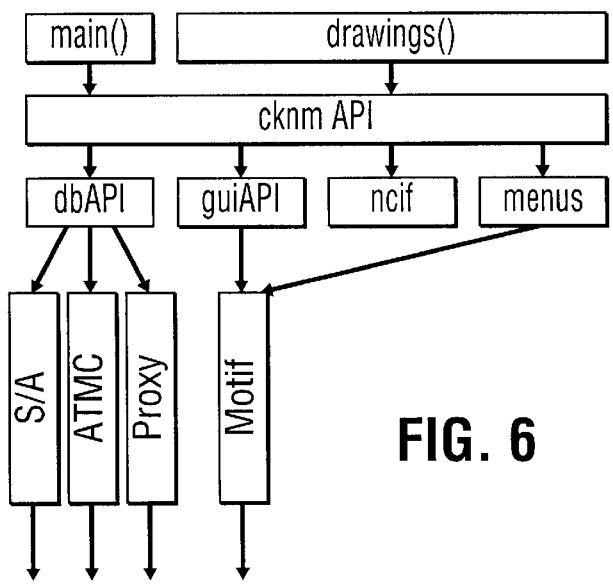
FIG. 6 shows the additions to the CKNM software to enable communication with the ATMC system.

FIG. 6 shows the additions to the software to enable communication with the ATMC system.

A new database API library is inserted which provides a stub interface to a database object that will implement the true ATMC database API. All other communication objects will be positions below this database API. In addition the current form processing will be updates to invoke ATMC form objects directly. These form objects will embody all of the information required to query and update node objects and display the information to the operator. Access to the node will be through the current CKNM generic database API. This API will be extended where required to handle the ATMC functionality.

The GEMClient is an object provided by the GEM sub-system to be used in client processes (i.e. Qs Mediator) to facilitate communication with the GEM processes. This object will generate IMF_Messages for transmission to the GEM.

The GEM Mediator is the gateway between the GEM process and the ATM-C Base process. It is responsible for transmitting and receiving IMF_Message to and from the ATM-C Base.

The GEM Mediator is made up of two public routines, one SendIMF provides an, optionally, blocking interface to the GEM process for transmission of IMF_Messages. The second interface will be a separate thread of execution slaved to the input socket for receiving IMF_Message transmissions to the GEM process. These methods are synchronized using a shared structure holding IMF_Message tags and IMF_Message pointers. SendIMF calls will perform a timed loop waiting for a response to a request. The shared structure will be protected with a semaphore to ensure exclusive access across threads.

Events and incoming requests will perform up-calls directly into the common API.

The mediator provides no encoding or decoding of IMF_Message short of tag mathcing and type discrimination (Event, Request, Reply). Private methods in the Mediator will be created to facilitate the access to the shared structure and IMF_Message headers.

The GEM Proxy is a simple object residing in the ATM-C Base process, and is the central point of communication between the GEM and the ATM-C Base.

The GEM Proxy will listen in on the socket connecting the GEM to the Base. When it detects an IMF message from the GEM (socket.read( )), it will forward it to the Router. GEM Proxy will also be responsible for sending IMF replies/requests that are meant for GEM from the Router, by putting these on the socket (socket.write( )).

The GEM Proxy will have multiple instances and will likely be instantiated either by a Qs draw request or Base creating an instance. Therefore, multiple instances will be based on a unique Base session id-one for each 'display'.

Processes requesting a session in the ATMC base must perform this function through the Session Manager object residing in the base. The initiation of the GEM process is done through a request from the Qs Mediator to the Session Managaer. The Session Manager will then launch the GEM process. The GEM process will LogIn to the Session Manager with the appropriate session ID to register against that session. All processes registered against a specific session can then be managed together.

Command line activation of the GEM without a session ID will cause the GEM to initiate it's own session, registered with the Session Manager.

Below is a list of IMF Requests (and Replies) that the GEM will support. The object supporting each request are identified in Section 0—CLASS DESCRIPTION.

| IMF Requests/Replies | Description |
|---|---|
| IMF_GUI_DrawRequest | Request to GEM to draw an object, |
| IMF_GUI_DrawReply | from Qs (via Base) |
| | GEM sends confirmation (OK |
| IMF_GUI_SelectRequest | Request to select an object, originates |
| IMF_GUI_SelectReply | from either GEM or 46020 |
| | GEM or 46020 sends confirmation (OK) |
| IMF_GUI_ClearRequest | Request to clear object selection, |
| IMF_GUI_ClearReply | originates only from 46020 |
| | GEM sends confirmation (OK) to Qs |
| IMF_GUI_HiliteRequest | Request to highlight a set of objects, |
| IMF_GUI_HiliteReply | from 46020 |
| | GEM sends confirmation (OK) |
| IMF_GUI_UnHiliteRequest | Request to clear highlighting from 46020 |
| IMF_GUI_UnHiliteReply | GEM sends confirmation (OK) |
| IMF_GUI_AddNodeRequest | Request to Add a Node Object to the |
| IMF_GUI_AddNodeReply | Base Database, from Qs |
| | GEM sends confirmation |

Figure 7:
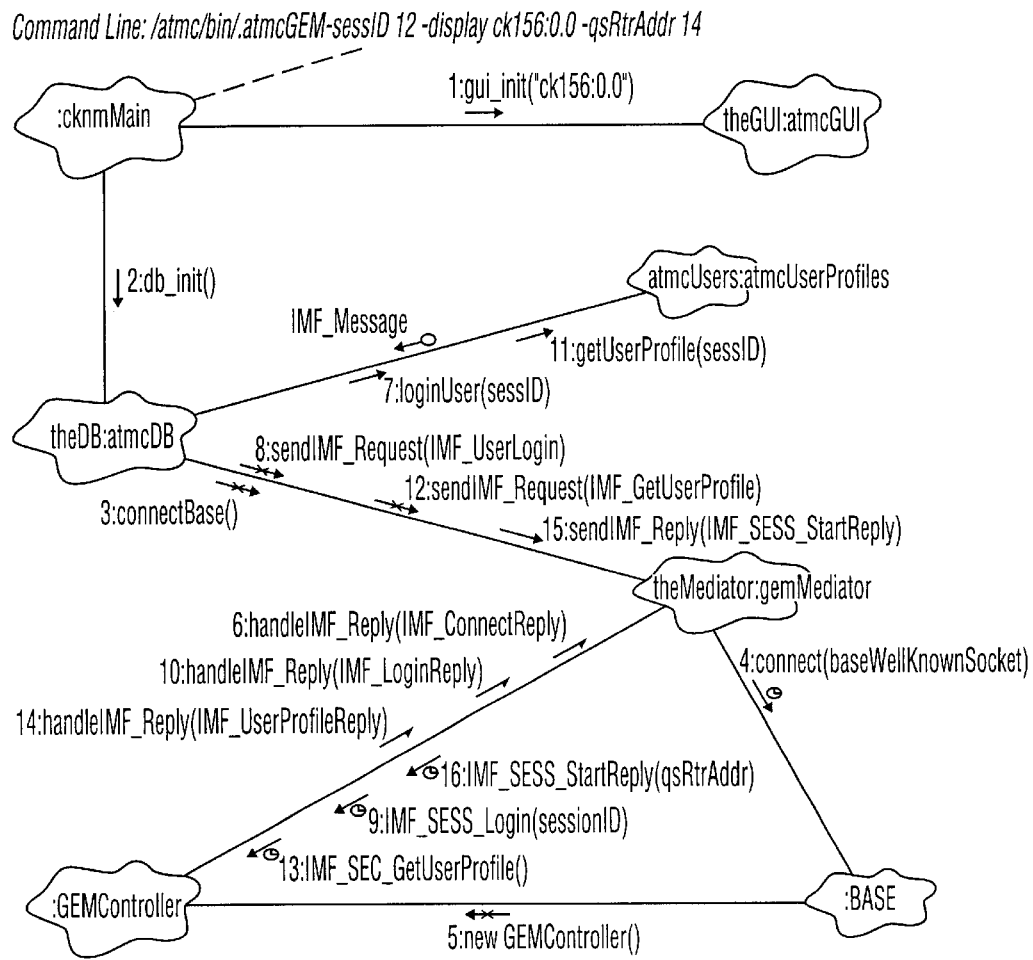
FIG. 7 shows Use Case—Remote 46020 Activation of GEM

Class Description
Class—DbAPI (Abstract)
Description
This object provides the virtual interface description for all of the database API objects, all virtual methods must be used
Export Control: public
Persistence: transient
Concurrency: sequential
Operations:
public
Prototype: BOOL db_init( )
Description:
Concurrency: sequential
Prototype: BOOL dbGetDeviceGeometry(enum deviceType)
Description: the information required to properly render this object on a graphical display
Concurrency: sequential
Prototype: BOOL dbGetNode(baseOID nodeOID, struct nodeInfo *)
Description: the node information from the current database
Concurrency: sequential
Prototype: BOOL dbLoginUser(struct userInfo *, int * sessionID)
Description: user information to allow a login to the base process
Concurrency: sequential
Prototype: BOOL dbGetPort(baseOID portOID, struct portInfo *)
Description: the information related to a specific port
Concurrency: sequential
Prototype: BOOL dbGetRack(baseOID rackOID, struct rackInfo *)
Description: the rack information for a specific rack
Concurrency: sequential
Prototype: BOOL dbGetCard(baseOID cardOID, struct cardInfo *)
Description: the card information for a specific card
Concurrency: sequential
Prototype: BOOL dbSetNode(baseOID nodeOID, struct * nodeInfo)
Description: the current node information
Concurrency: sequential
Prototype: BOOL dbSetRack(baseOID rackOID, struct rackInfo *)
Description: the rack configuration
Concurrency: sequential
Prototype: BOOL dbSetCard(baseOID cardOID, struct cardInfo *)
Description: the card configuration
Concurrency: sequential
Prototype: BOOL dbSetPort(baseOID portOID, struct portInfo *)
Description: the port configuration
Concurrency: sequential
Prototype: BOOL dbAddNode(baseOID nodeOID, struct * nodeInfo)
Description: a node to the ATMC database
Concurrency: sequential
Prototype: BOOL dbAddRack(baseOID rackOID, struct * rackinfo)
Description: a rack object to the node configuration
Concurrency: sequential
Prototype: BOOL dbAddCard(baseOID cardOID, struct * cardInfo)
Description: a card to the node configuration
Concurrency: sequential
Prototype: BOOL dbDeleteNode(baseOID nodeOID)
Description: a node configuration from the ATM-C
Concurrency: sequential
Prototype: BOOL dbDeleteRack(baseOID rackOID)
Description: a rack configuration object from the database
Concurrency: sequential
Prototype: BOOL dbDeleteCard(baseOID nodeOID)
Description: a card configuration object from the database
Concurrency: sequential
Prototype: BOOL getDeviceMenu(enum deviceType, struct * menuItems)
Description: the menu items associated with this object
Concurrency: sequential
Class—atmcDB
Superclasses: public DbAPI
Description provides the interface specific implementation of the GEM database
Export Control: public
Persistence: transient
Concurrency: sequential
Class—atmcMenus (Abstract)
Description
A menu will be displayed on the XDisplay using information extracted from the NCIF files, the current selected device and the user profile information
Export Control: public
Persistence: transient
Concurrency: sequential
Attributes:
private
    struct * menuList=NULL
Operations:
public Prototype: BOOL displayMenu(userInfo *, enum deviceType, baseOID deviceOID)
Description: the requested menu on the current display
Concurrency: sequential
Prototype: XCallback mouseCallback(struct * mouseInfo)
Description: actions in response to mouse events
Concurrency: sequential
Class—formRegistry
Description
provides a central registry for all display forms, allows different forms to be associated with devices and operations, provides soft-binding of X11 configure forms to display objects
Export Control: public
Persistence: transient
Concurrency: sequential
Attributes:
private
　　struct formTable=NULL
Operations:
public
Prototype: BOOL registerForm(configForm * newForm, enum deviceType, char * operation)
Description: a form against a device type and operation
Concurrency: sequential
Prototype: configForm * queryForm(enum deviceType, char * operation)
Description: other objects to query the display form for a given device type and operation
Concurrency: sequential
Class—gemMediator
Description
provides a blocking interface to the services provided in the ATMC base process
Export Control: public
Persistence: transient
Concurrency: sequential
Attributes:
private
　　long routerAddr=NULL
　　long seesionID=NULL
　　socketAddr localSocket=NULL
　　scoketAddr remoteSocket=NULL
　　struct * requestList=NULL
Operations:
private
Prototype: callback handleIMF_Reply(void)
Description: callback handler for socket reads
Concurrency: sequential
Prototype: BOOL lockRequestList(BOOL lock)
Description: semaphore access routine to provide access to the shared request list
Concurrency: sequential
public
Prototype: BOOL sendIMF_Request(struct IMF * request, struct IMF * reply)
Description: a blocking call for tranmission of an IMF request
Concurrency: sequential
Prototype: BOOL sendIMF_Reply(struct IMF * reply)
Description: non-blocking request to transmit an IMF reply message
Concurrency: sequential
Prototype: BOOL connectBase(void)
Description: the connection to the base process
Concurrency: sequential Class—NCIF (type=class_utility)
Description
this object provides the access to the NCIF files which contain geometry of devices for drawing, creation rules for device creation and menu operations associated with devices
Export Control: public
Persistence: transient
Concurrency: sequential
Attributes:
private
　　char [ ] baseDirectory=getenv("em_NCIF");
　　struct ncifGeometryTable=NULL
　　struct ncifMenuTable=NULL
　　struct ncifOptionLists=NULL
Operations:
public
Prototype: BOOL getGeometry(enum deviceType, struct drawItems *)
Description: the drawing rules for the specified device type from the NCIF files
Concurrency: sequential
Prototype: BOOL getCreateRules(enum deviceType, struct deviceRules *)
Description: the allowable device types for the creation of a new contained device
Concurrency: sequential
Prototype: BOOL getmenu(enum device Type, struct menuList *)
Description: the list of menu items and associated operations for display when the user right-clicks on a device
Concurrency: sequential
Prototype: BOOL setBaseDirectory(char * newBase, BOOL createIfNotFound)
Description: an external object to reset the base directory for all of the NCIF files, causes the data structures to be re-initialized
Concurrency: sequential
Class Category: atmcForms
Class—atmcForms (Abstract)
Description
this class provides the framework to display a configuration form on the local XDisplay of the ATMC and/or 46020 (remote XDisplay), all operator interaction is handled by the widgets
Export Control: public
Persistence: transient
Concurrency: sequential
Operations:
public
Prototype: BOOL openForm(baseOID)
Description: the form to open on the XDisplay, retrieve the associated data and display the data
Concurrency: sequential
Prototype: BOOL updateForm(struct * updateInfo)
Description: an asynchronous interface for the GEM IMF sub-system to alert the from of changed data, it is up to the form to determine if the data is appropriate for display to the operator
Concurrency: sequential
Prototype: XCallback buttonCallbacks(int buttonID)
Description: form will register callbacks against button actions to allow interaction with the widgets on SAVE and CANCEL requests
Concurrency: sequential
Class—atmcForm_Dashboard
Class—atmcForm_LocalLogin
Class—atmcForm_AddNode Class—atmcForm_AddRack
Class—atmcForm_AddCard
Class—atmcForm_ConfigureNode
Class—atmcForm_ConfigureRack
Class—atmcForm_ConfigureCard
Class—atmcForm_E1_ConfigureCard
Class—atmcForm_STM1o_ConfigureCard
Class—atmcForm_STM1e_ConfigureCard
Class—atmcForm_ConfigurePort
Class Category: atmcWidgets
Class—atmcWidgets (Abstract)
Description
this class provides the framework to support display of intelligent display objects on GEM forms
Export Control: public
Persistence: transient
Concurrency: sequential
Operations:
public
Prototype: XmWidget * init(void)
Description: the widget
Concurrency: sequential
Prototype: BOOL setInitialValue(char * initialValue)
Description: the data value of the widget
Concurrency: sequential
Prototype: BOOL haschanged(void)
Description: whether the operator changed the value displayed by this object
Concurrency: sequential
Prototype: BOOL canSave(void)
Description: whether the initial value is different than the database value, application can deterimine whether a save operation can safely proceed without overwritting changes
Concurrency: sequential
Prototype: BOOL setDBValue(char * newValue)
Description: the just retrieved value into the widget for future comparison by the application
Concurrency: sequential
Prototype: char * getCurrentValue(void)
Description: the user editted value
Concurrency: sequential
Prototype: XCallback callbackMethods( )
Description: actions in response to various events sent from the XDisplay
Concurrency: sequential
Class—atmcWidget_Boolean
Superclasses: public atmcWidgets
Description
provides display of a boolean value, each state (TRUE/FALSE) can be associated with both a numeric value and a text string
Export Control: public
Persistence: transient
Concurrency: sequential
Attributes:
private
    integer state_0_Int=0
    integer state_1_Int=1
Operations:
public
Prototype: XmWidget * init(RECT * position, int state_0, int state_1)
Description: the BOOL widget with the various things it needs to display
Concurrency: sequential
Class—atmcWidget_Float Class—atmcWidget_Button
Class—atmcWidget_String
Class—atmcWidget_Choice
Class—atmcWidget_List
Class—atmcWidget_Integer
Class Category: NE_Objects (Network Element)
Class—NE_Object (Abstract)
Description
This class provides an abstract base class for encapsulation of all IMF_Message interaction with the corresponding object in the ATMC Network Element Model (NEM). This class will understand, generate and decode all IMF_Messages associated with this object. It is expected that each object that the GEM manages will inherit this functionality, and add methods as required to support all functionality associated with this object
Export Control: public
Persistence: transient
Concurrency: sequential
Attributes:
private
    baseOID objectID=NULL
    struct * objectInfo=NULL
Operations:
public
Prototype: virtual IMF_Message Get(void)=0
Description: method will generate the approriate IMF_Message to retrieve this object from the ATMC base
Concurrency: sequential
Prototype: virtual IMF_Message Set(void)=0
Description: method will generate the approriate IMF_Message to update this object in the ATMC base
Concurrency: sequential
Prototype: virtual BOOL Reply(IMF_Message *)=0
Description: method will decode the IMF_Message recieved from the Base in response to a previous request
Concurrency: sequential
Prototype: virtual BOOL GetAttr(char * attrName, int * attrValue)=0
Description: method will retrieve a single attribute from the local copy of this object data, this method will be overloaded based on the type of data expected. The BOOL return type indicates if the attribute name is valid
Concurrency: sequential
Prototype: virtual BOOL SetAttr(char * attrName, int attrValue)=0
Description: method will set a single attribute into the local copy of this object data, this method will be overloaded based on the type of data expected. The BOOL return type indicates if the attribute name is valid.
Concurrency: sequential
Prototype: virtual BOOL SetOID(baseOID objectOID)=0
Description: method sets the object ID for this object
Concurrency: sequential
Prototype: virtual IMF_Message AddObject(void)=0
Description: method generates an Add Object message, if applicable for this object, to be sent to the base
Concurrency: sequential
Prototype: virtual IMF_Message DeleteObject(void)=0
Description: method will generate a Delete Object message for transmission to the ATMC Base
Concurrency: sequential
Class—nodeNE
Class—V3-40_nodeNE
Class—V3-160_nodeNE
Class—V3_nodeNE
Class—rackNE Class—ASN_rackNE
Class—AUB_rackNE
Class—AUB-SMU_rackNE
Class—cardNE
Class—E1_cardNE
Class—STM-1e_cardNE
Class—STM-1o_cardNE
Class—portNE
Class—GEMClient
Description
This object is similar to the NE_Objects in that it provides client side functionality to generate IMF_Messages for transmission to the GEM process. This object is not used directly by the GEM but is used by clients of the GEM to hide the IMF_Message generation.
Export Control: public
Persistence: transient
Concurrency: sequential
Attributes:
private
   char * xDisplay="0:0"
   int routerAddr=0
   int sessionID=0
   baseOID selectObject=NULL
Operations:
public
Prototype: BOOL SetDisplay(char * xDisplay)
Description: the display for the associated GEM, this function does not do anything once the GEM has been started.
Concurrency: sequential
Prototype: BOOL SetSessionInfo(int sessionID, int routerAddr)
Description: the session and router info for the associated GEM process
Concurrency: sequential
Prototype: IMF_Message DrawObject(baseOID objectOID)
Description: ann IMF_Message that can be transmitted to the GEM to trigger a drawing or form display for the assocaited object
Concurrency: sequential
Prototype: IMF_Message SelectObject(baseOID selectedOID)
Description: the current object selection on the associated GEM
Concurrency: sequential
Prototype: IMF_Message ClearSelectedObject(void)
Description: the object selection on the assocaited GEM
Concurrency: sequential
Prototype: BOOL Reply(IMF Message *)
Description: all IMF_GUI messages from the associated GEM. Will record the currently selected object on the assocaited GEM in a local variable for process query
Concurrency: sequential
Prototype: IMF_Message HighlightList(hiliteList * objectList)
Description: method generates a highlight list for the assocaited GEM
Concurrency: sequential
Prototype: IMF_Message ClearHighlight(void)
Description: method generates a clear highlight message for the assocaited GEM
Concurrency: sequential FIG. 7 shows the activation of the GEM process in response to a GUI-Login from the 46020 network manager to the ATMC using the Qs connection. This use case documents the reaction of the GEM to this GUI-Login.

The GEM process is activated using from within the ATMC Base by the Security Management sub-system. Command line parameters are provided as follows:

Command Line: /atmc/bin/.atmcGEM-sessID 12-display ck156:0.0-qsRtrAddr 14

The session ID and the Qs mediator router address indicate to the GEM process that it has been activated by the 46020. The display tag indicates the X-Display on which to display it's drawings and forms. No actual output will be generated until an IMF_GUI_Draw command is received.

Once activated the GEM process will perform the following actions:
connect to the BASE process
login to the Session Manager giving the existing session ID
request User Information for this session from the Security Manager
send start reply back to Qs Mediator indicating that GEM process is active The IMF message structure should be augmented with parent process ID tags to allow the ATMC Base software to verify that the source of the IMF_Messages. This will prevent an operator from viewing the startup command for the GEM and duplicating this process to start a potentially privileged session.

Figure 8:
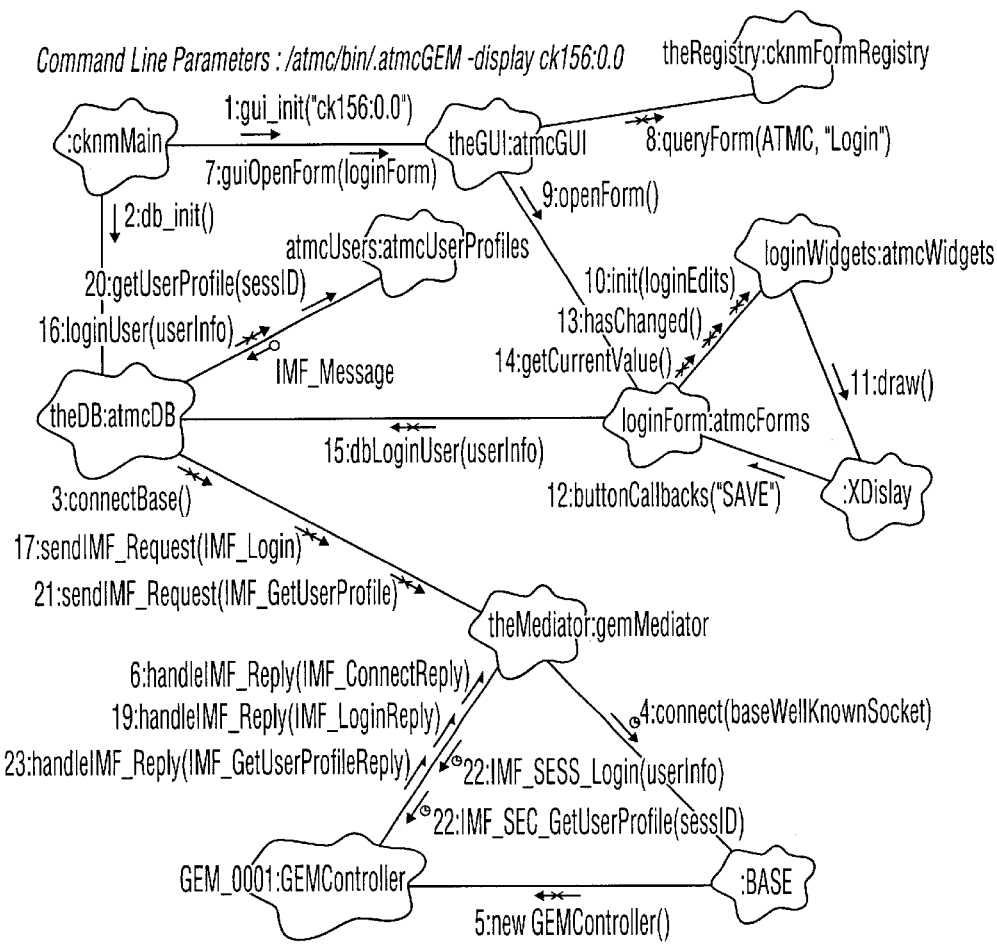
FIG. 8 shows Local GEM Activation.
Figure 9:
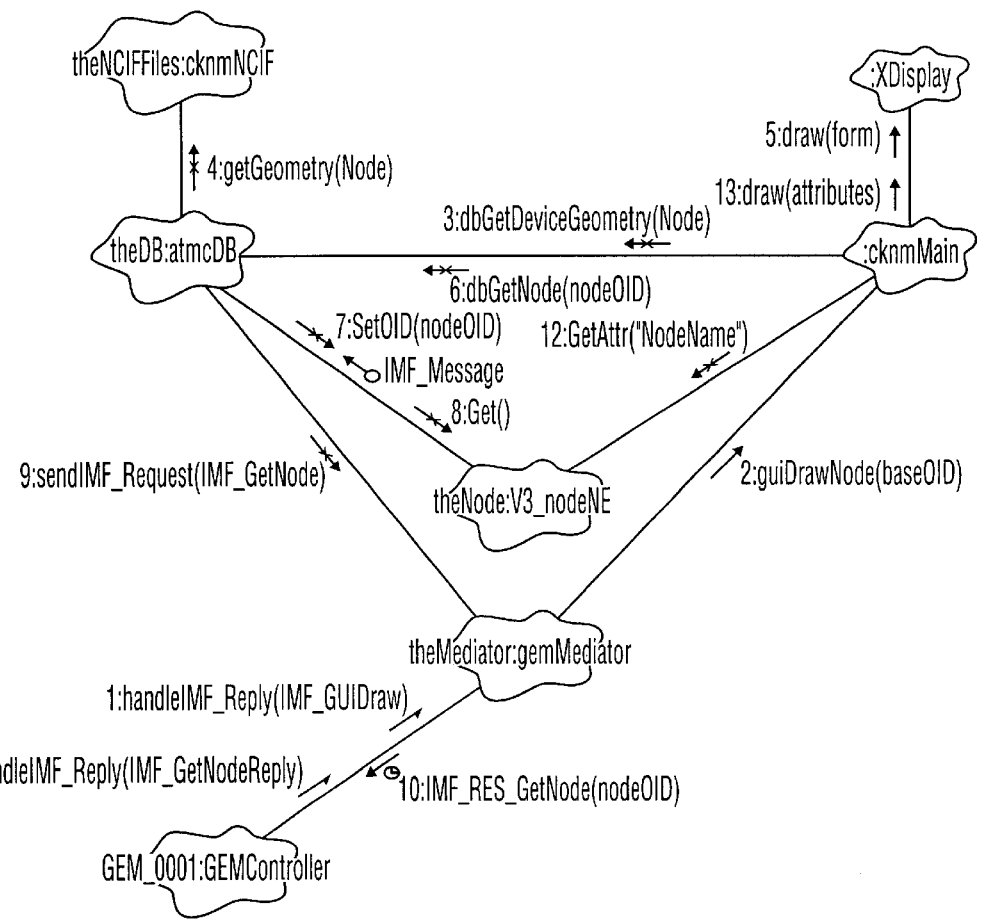
FIG. 9 shows an Open Node Request from 46020.
Figure 10:
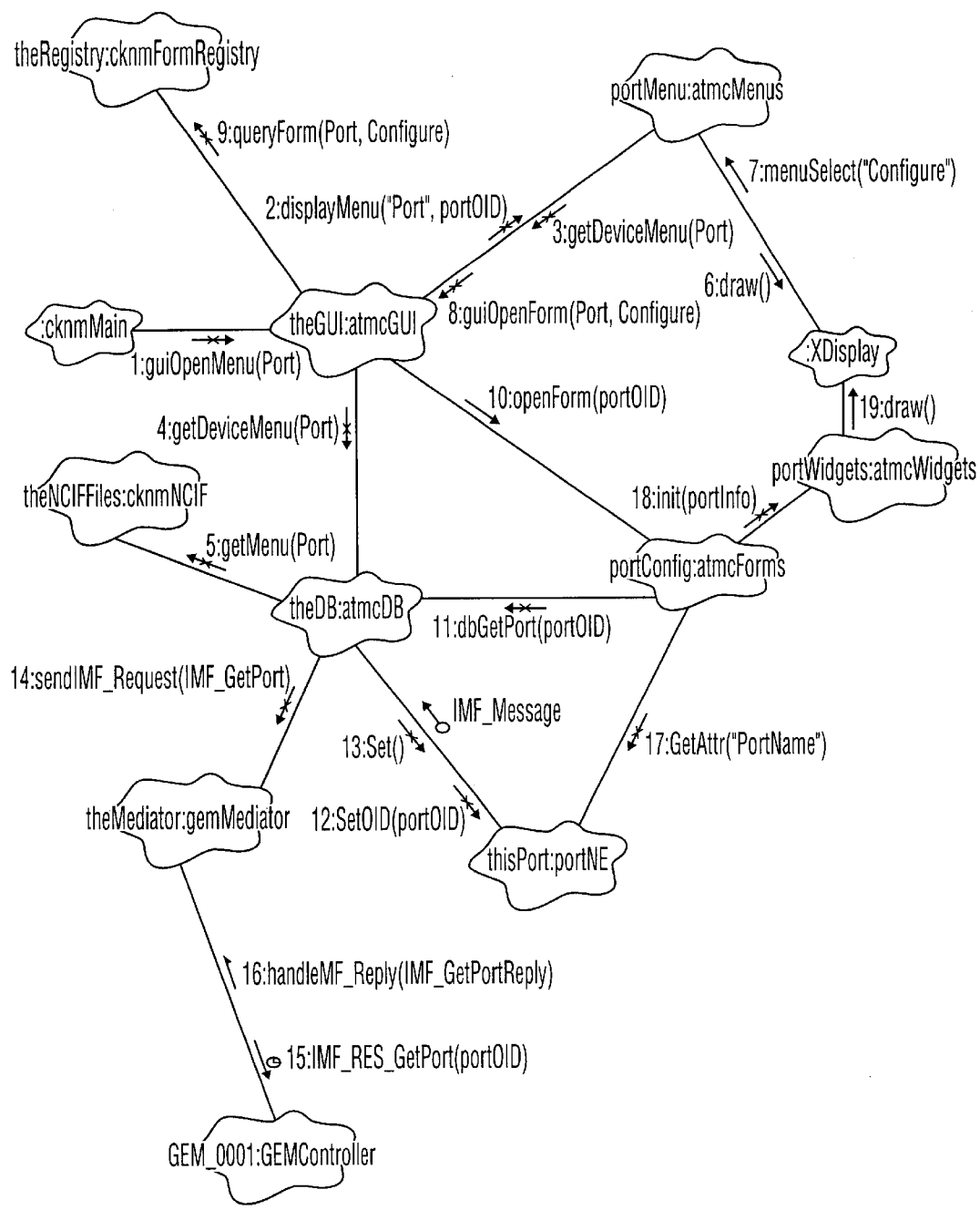
FIG. 10 shows the case for an Open Port Configuration.
Figure 11:
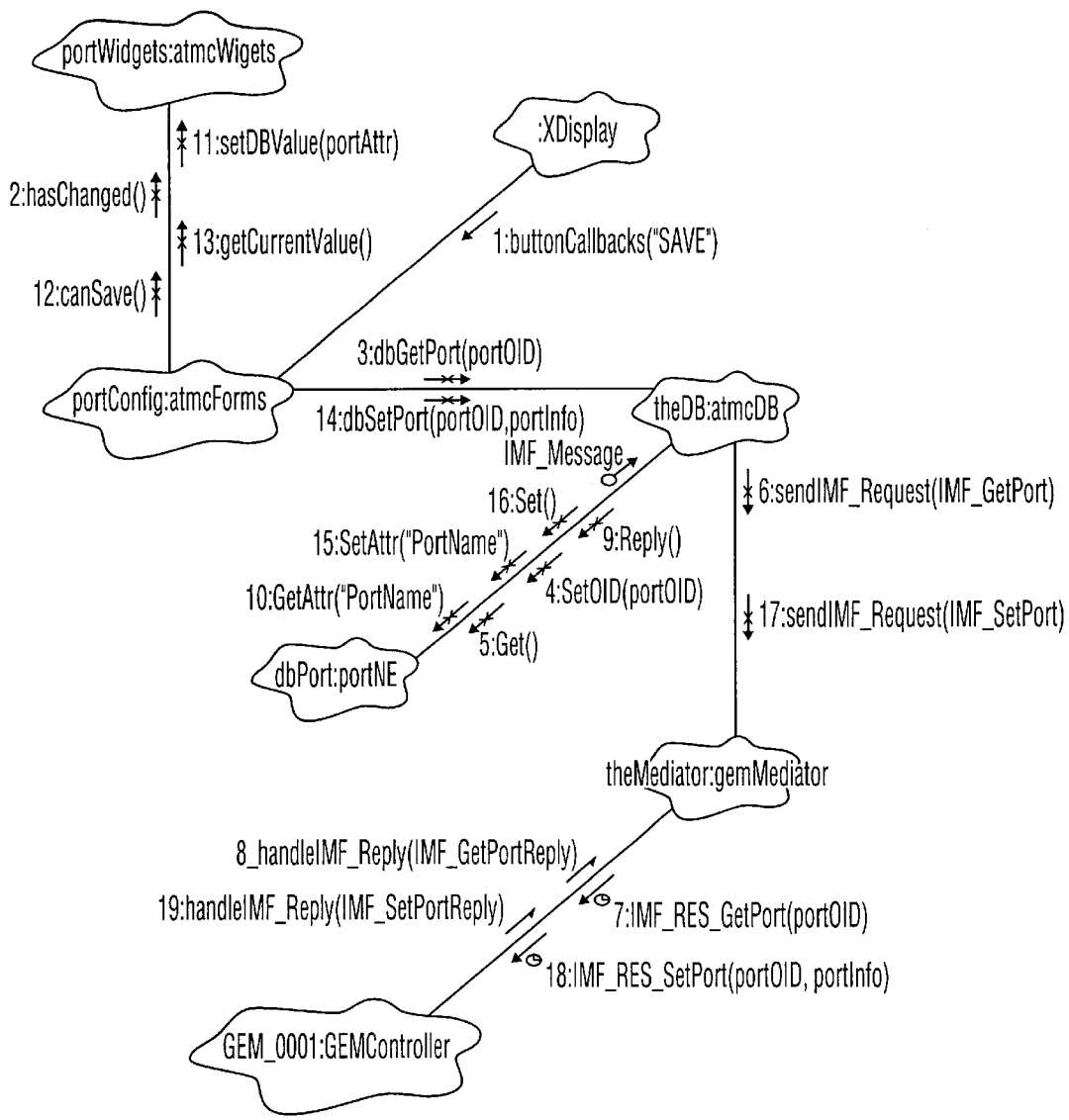
FIG. 11 shows a set port configuration.
Figure 12:
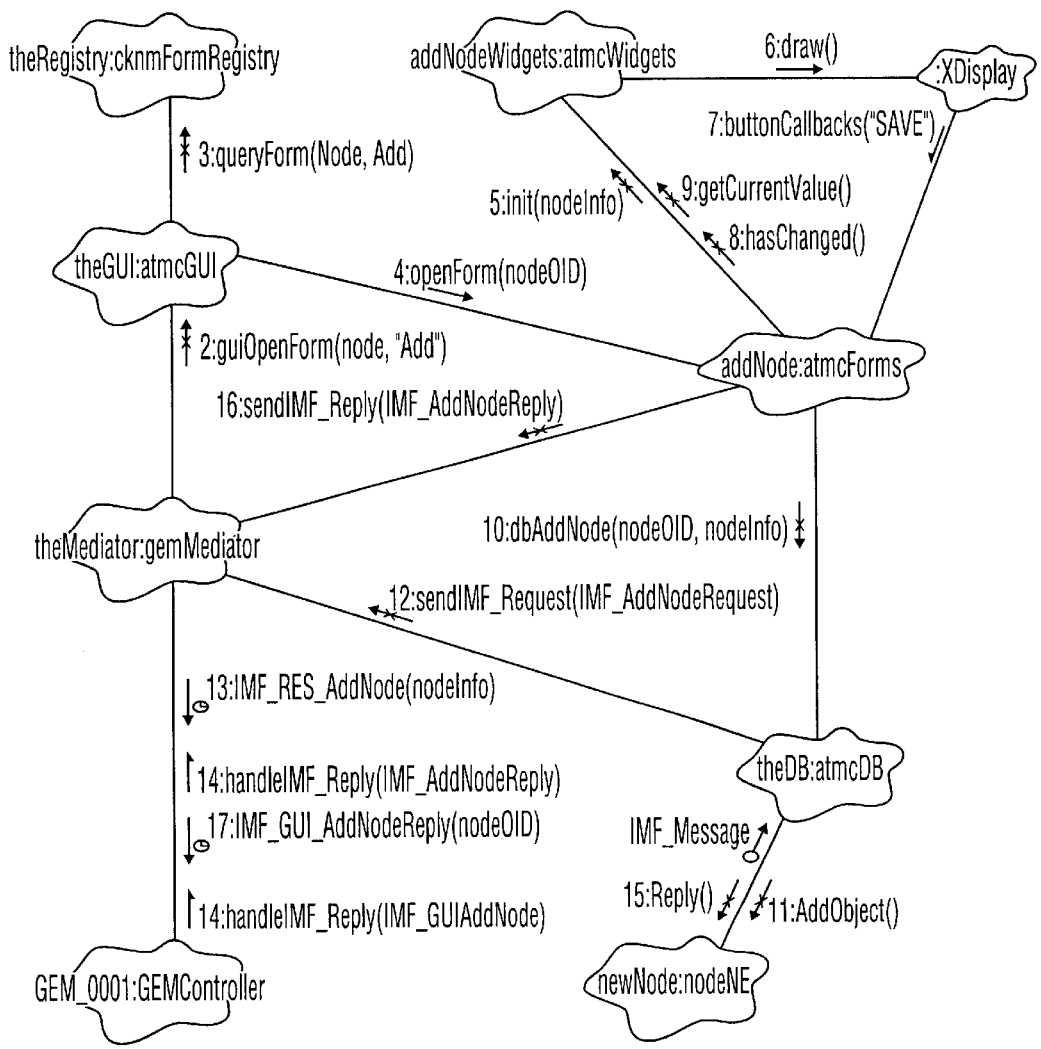
FIG. 12 shows an Add Node Request from the 46020 Network Manager.
Figure 13:
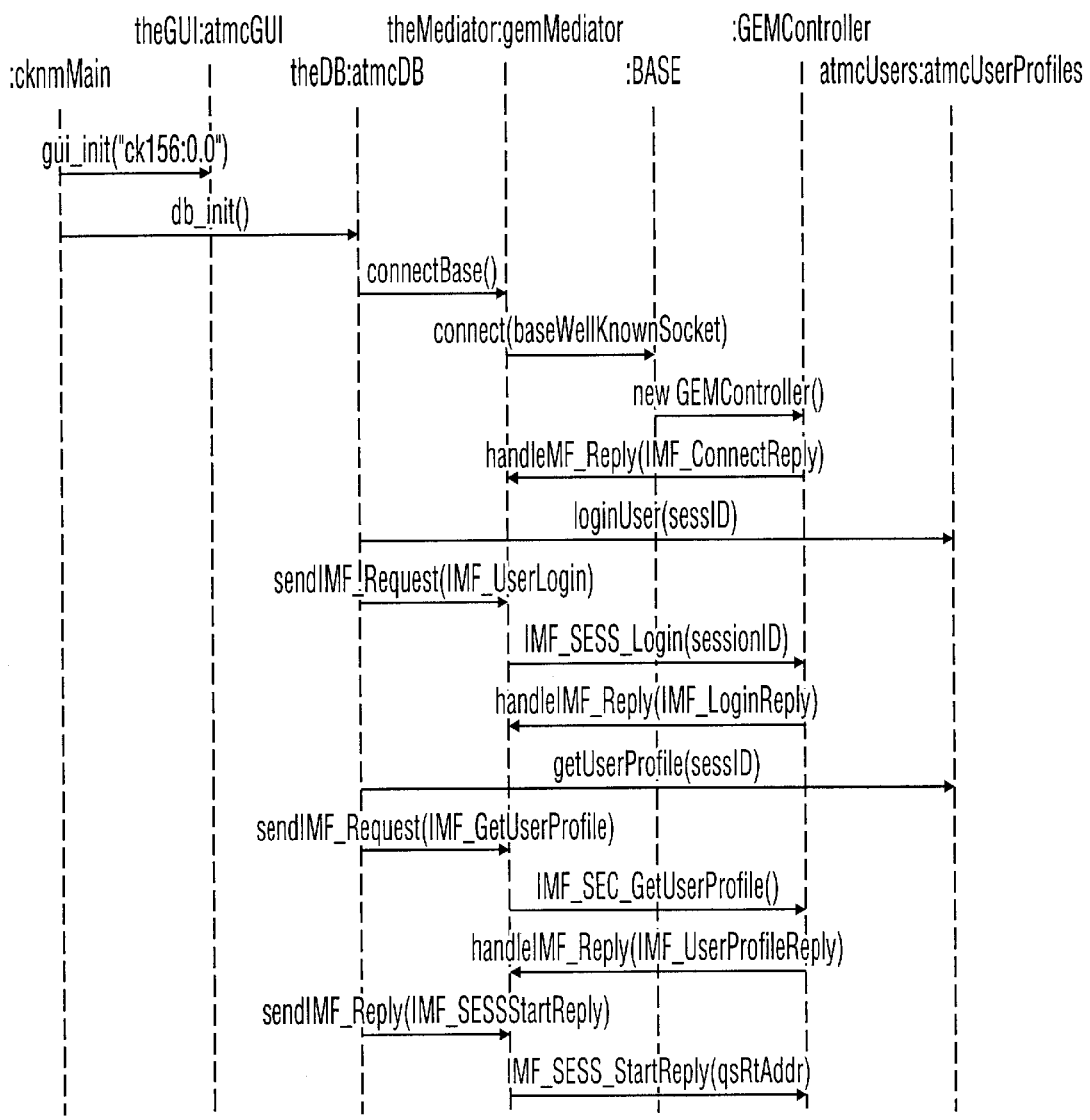
FIG. 13 shows the Remote Activation of GEM.

In the case of local activation of the GEM, the GEM process will be requested by a local or remote operator using a Telnet or rlogin type interface. A command line will be entered identifying the X-Display to be used and the GEM process will respond as follows:
initialize the database and gui API structures
connect the GEMprocess to the ATMC Base
present login form to the operator
collect user information and pass to the Security Manager in the Base for verification
once verified collect user profile information
indicate success to the operator and present the top level form for the stand-alone ATMC At various times during the Qs session with the 46020 draw requests will be received by the GEM from the Qs Mediator through the Qs connection to the 46020. This request will trigger a drawing or form display on the existing X-Display attached to this process. The interaction is itemized below:
draw request received from GEM Mediator
common guiDrawNode request invoked drawing frame is displayed, geometry of node to be drawn is retrieved from the NCIF files
actual node data is requested from the common database API
node_NE object is instantiated and initialized with the base OID of the node
the node_NE generates an IMF_Message to retrieve the data from the ATMC base
IMF_Message is transmitted and reply received
IMF_Message is returned to the node_NE object, this object is passed back to the drawing which querys the object for attribute information
node drawing is populated on the X-Display As shown in FIG. 8, when a draw request is received on an object without a drawing association a configuration form will be displayed. In the case of a port configuration request the interaction is shown above, as described below:
right mouse button is pressed, CKNM requests a card drawing menu for a selected port
menu contents is queried form the NCIF files and displayed
menu item is selected and appropriate action, "Configure Port" is requested form is looked up in the form registry and created
port configure form used the port OID and an associated port_NE object to generate a IMF_RES_GetPortRequest for transmission to the ATMC base
reply is handed hack to the port_NE object
form queried port_NE for attributes, intelligent widgets are created and given the inital values for display on the X-Display As shown in FIG. 11, when a port configuration form is displayed, either locally or remotely, the operator is permitted to manipulate the data on that form. At some point in time the operator will request that the data be saved. The object interaction is described below:

buttonPressed event is received from operator
the form checks if anything has been changed by the operator
port configure form requests current data from the ATMC base to determine if the data have changed since the form was displayed
the port configure data is passed into the widgets
the form queries each widget to determine is the data can be safely saved (if the data has been changed outside of the form, by another operator, the widget will report FALSE to this query)
all data is then collected and passed to the database API for transmission to the node Add Node Request from 46020

This use case documents the process occurring when a 46020 operator requests a new node object created. The first list details events occurring external to the GEM. The information after the figure below details the actions occurring inside the GEM.

Trigger Events for Add Node

The 46020 will send a Qs Create Node message to the ATMC Qs Server. The Qs mediator will send a IMF Create Node request to the GEM Controller. An IMF Create Node Acknowledge command will be sent to the Qs Mediator from the GEM Controller once the message has been received and validated. The Qs Mediator will then send a Qs Create Node Acknowledge. The GEM controller will then connect to the node. Once the node is on-line, an IMF Event message will be sent to the Qs Mediator indicating that the node is on-line. The Qs Mediator will then send a IMF Reconcile Node command to the V3 controller which will initiate the internal reconcile of the node. The Qs Mediator will ignore any events generated by the node creation.

When the reconcile is complete an IMF Reconcile Complete Reply will be sent to the Qs Mediator. The Qs Mediator will send multiple IMF Get Requests to the V3 Controller. The V3 Controller will send multiple IMF Get Replies to the Qs Mediator. The Qs Mediator will convert the Get Replies into Qs Datasync Add Event Notifications and send them to the 46020. When the reconcile is complete the Qs Mediator will send a Qs Datasync Modify event to the 46020 to change the node status to on-line.

Once an add node request is received by the GEM a configuration form must be displayed on the remote X-Display (46020 or other) to collect association information for inclusion in the IMF_Message request to add a new node to the ATMC database. The interactions occuring in the GEM are detailed below:

add node request is received
add node form is displayed on X-Display
data is collected from widgets
new node_NE object is created and it is asked to generate an IMF_Message for adding a new node
the message is transmitted to the ATMC Base and a response received
an IMF_Message is returned to the Qs Mediator to indicate that the mdoe has been created FIGS. 13 to 18 show interaction diagrams for use cases.

What is claimed is:

1. A method managing network elements in an object model of a digital communications network having a central network management station and a graphical element manager connected to said central network management station, comprising selecting on one application at a graphical user interface at said central network management station an object common to said central network management station and said element manager, communicating said selection to another application on said element manager by sending a message to said element manager with the aid of a suitable protocol, requesting at said central network management station performance of an operation on said selected object by said element manager, sending a message to the application on said element manager to perform said operation on said selected object, performing said operation on said selected object by said application on said element manager, and sending a message to the application on said central management station to notify said central management station of the completion of said requested operation and update the status of said object at said central management station.

2. A method as claimed in claim 1, wherein said network is an ATM network.

3. A method as claimed in claim 1, wherein said common object is selected with a pointing device.

4. A method as claimed in claim 3, wherein said element manager has a socket for exchanging messages with said application using said protocol.

5. A method as claimed in claim 1, wherein said element manager includes a base class for encapsulation of message interaction with a corresponding object in a network element model, said class understanding, generating and decoding all messages associated with this object.

* * * * *